(12) United States Patent
Khouri (10) Patent No.: US 10,577,039 B2
(45) Date of Patent: Mar. 3, 2020

(54) TRAINING AID FOR BICYCLE (71) Applicant: Khalil Khouri, Key Biscayne, FL (US)

(72) Inventor: Khalil Khouri, Key Biscayne, FL (US)

(*) Notice: Subject to any disclaimer, the term of this patent is extended or adjusted under 35 U.S.C. 154(b) by 131 days.

(21) Appl. No.: 15/727,295

(22) Filed: Oct. 6, 2017

(65) Prior Publication Data
US 2019/0106168 A1 Apr. 11, 2019

(51) Int. Cl.
B62H 1/12 (2006.01)
B62H 7/00 (2006.01)
B62K 5/01 (2013.01)
B62K 5/10 (2013.01)

(52) U.S. Cl.
CPC .......... B62H 1/12 (2013.01); B62H 7/00 (2013.01); B62K 5/01 (2013.01); B62K 5/10 (2013.01)

(58) Field of Classification Search
CPC ... B62H 1/12; B62H 7/00; B62K 5/01; B62K 5/10
USPC .......................................... 280/293
See application file for complete search history.

(56) References Cited

U.S. PATENT DOCUMENTS

| | | | | |
|---|---|---|---|---|
| 2,450,979 A | * | 10/1948 | Moller | B62H 1/12 280/293 |
| 3,603,575 A | * | 9/1971 | Arlasky | B60G 17/021 267/34 |
| 3,642,305 A | * | 2/1972 | Pawsat | B62H 1/12 280/293 |
| 4,595,213 A | * | 6/1986 | Tsuchie | B62H 7/00 280/293 |
| 4,616,810 A | * | 10/1986 | Richardson | F16F 9/42 180/227 |
| 4,830,395 A | * | 5/1989 | Foley | B60G 17/0272 267/177 |
| 5,044,614 A | * | 9/1991 | Rau | B60G 15/062 267/175 |
| 5,064,213 A | * | 11/1991 | Storch | B62H 1/12 280/293 |
| 5,100,163 A | * | 3/1992 | Egley | B62H 1/12 280/293 |
| 5,352,403 A | * | 10/1994 | Egley | B62H 1/12 280/293 |
| 5,580,034 A | * | 12/1996 | Cheng | B60G 17/021 188/322.17 |
| 5,803,443 A | * | 9/1998 | Chang | B60G 15/063 267/177 |
| 6,318,745 B1 | * | 11/2001 | Sharp, III | B62H 1/12 280/293 |
| 6,331,012 B1 | * | 12/2001 | Eisenmann, II | B62H 1/12 280/293 |

(Continued)

Primary Examiner — Joseph M Rocca
Assistant Examiner — Marlon A Arce
(74) Attorney, Agent, or Firm — Mark Terry (57) ABSTRACT A stabilizing apparatus for a bicycle is disclosed. The stabilizing apparatus includes a vertical member configured for coupling to a distal end of a rear hub of the bicycle, a horizontal member hingably attached at a proximal end to the vertical member, a wheel attached to a distal end of the horizontal member, the wheel configured for laterally supporting the bicycle, a preloaded strut hingably attached at a top end to the vertical member, and hingably attached at a bottom end to the horizontal member, and an adjustable device located on the preloaded strut, the adjustable device configured for adjusting a rest compression state of the preloaded strut.

10 Claims, 12 Drawing Sheets (56) References Cited

U.S. PATENT DOCUMENTS

| | | | |
|---|---|---|---|
| 6,691,991 B1* | 2/2004 | Huang | B60G 15/063 267/286 |
| 6,705,632 B2* | 3/2004 | Yoshida | B62H 1/12 280/288.4 |
| 7,641,213 B1* | 1/2010 | Chen | B62H 1/12 280/293 |
| 8,376,384 B2* | 2/2013 | Tsai | B62H 1/12 280/293 |
| 9,475,532 B2* | 10/2016 | Di Vitto | B62H 1/12 |
| 2010/0252972 A1* | 10/2010 | Cox | B60G 15/063 267/218 |
| 2017/0334496 A1* | 11/2017 | Di Vitto | B62H 1/12 |

* cited by examiner

Prior Art

TRAINING AID FOR BICYCLE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNOLOGICAL FIELD

Most broadly, the disclosed subject matter relates to the field of bicycles, and more particularly, it is directed to training aids and accessories for bicycles.

BACKGROUND

Figure 13:
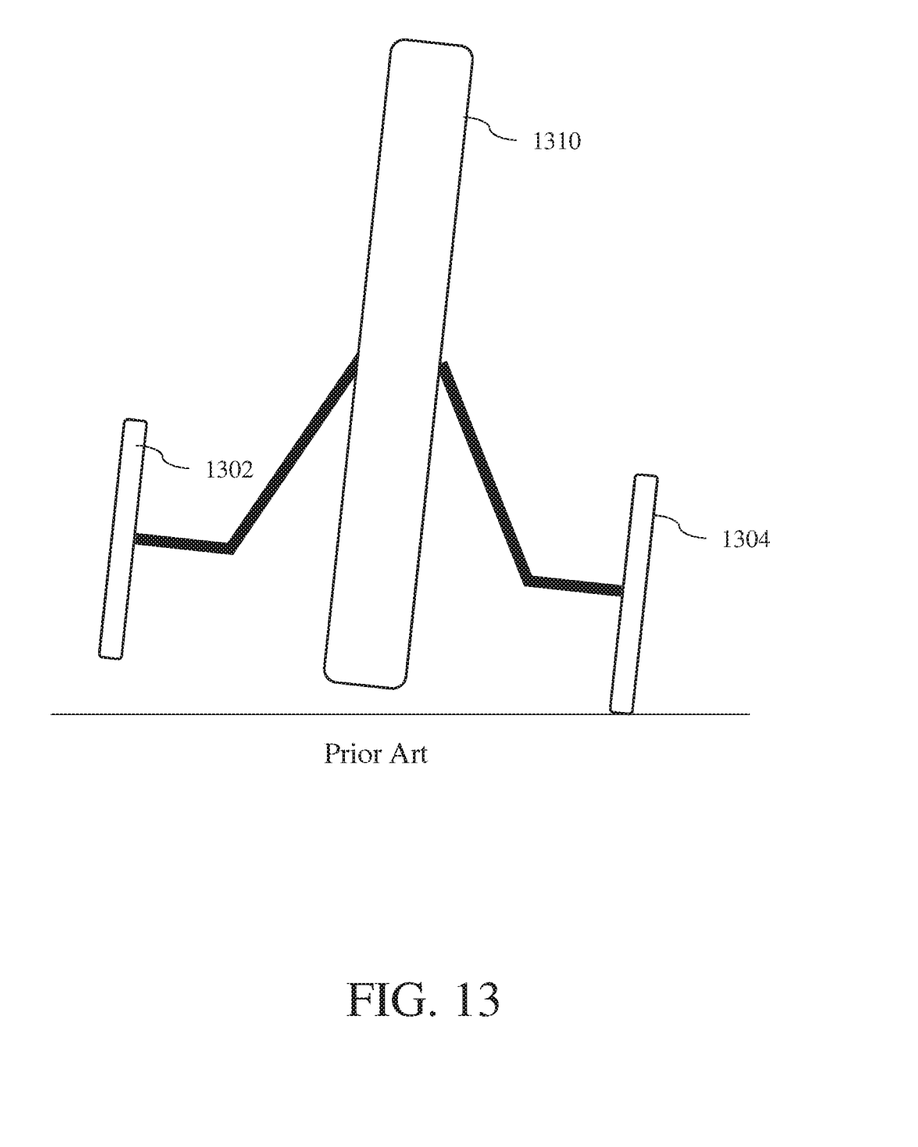
FIG. 13 is a rear view of prior art training wheels.

Training wheels are additional wheels mounted parallel to the rear wheel of a bicycle that assist learners until they have developed a usable sense of balance on a bicycle. Typically, training wheels are used in beginners, such as children, to ride a bike. Conventional training wheels for bicycles typically consist of rigid brackets which are mounted onto the rear axle of a bicycle. These devices, however, provide a certain or static amount of give or flex when lateral forces are applied to the device. During a sharp turn, when the bicycle tilts significantly into the turn, the bicycle weight is transferred from the main rear wheel to the training wheel on the side on which the bicycle tilts (see FIG. 13). When the bicycle tilts excessively, the rear bicycle wheel can actually rise off the ground, as shown in FIG. 13. When this occurs, the center of gravity may extend beyond the respective training wheel, and restoring the balance against the centrifugal force becomes very difficult if not impossible, thus resulting in an increased risk of falling. A number of approaches to this problem provide more flexible training wheels that can accommodate changes in the tilting positions of the bicycle. But these approaches have generally been cumbersome, complex and expensive to manufacture.

Another problem associated with conventional training wheels it the static amount of give or flexibility that is provided by the training wheels. Since the training wheels are typically mounted onto rigid L-shaped brackets, there is little or no give or flexibility provided when the bicycle leans towards said training wheel. This can be detrimental to learning to ride a bicycle since the act of leaning and maintaining balance are fundamental concepts that must be learned when learning to ride a bicycle. Furthermore, when a beginner starts to gain proficiency in riding a bicycle, it is instructive to introduce small amounts of leaning to the beginner, so as to start the process of learning this valuable skill. This cannot be done with conventional training wheels that provide little or no give or flexibility. Consequently, conventional training wheels limit the amount a beginner can learn, once the beginner gains enough proficiency to start learning about leaning and maintaining one's balance.

Yet another problem associated with conventional training wheels is the lack of force provided by the training wheels. When the bicycle leans towards said training wheel during a turn, a static or rigid training wheel simply stops the bicycle from leaning toward said training wheel, but the training wheel does not provide a force toward the midpoint of the bicycle. Consequently, conventional training wheels are limited in their usefulness to beginners learning to maintaining their balance on a bicycle.

Consequently, a need exists to overcome the problems with the prior art as discussed above, and particularly for improved and innovative training aids for bicycles.

SUMMARY

Briefly, according to an embodiment, a stabilizing apparatus for a bicycle is disclosed. The stabilizing apparatus includes a vertical member configured for coupling to a distal end of a rear hub of the bicycle, a horizontal member hingably attached at a proximal end to the vertical member, a wheel attached to a distal end of the horizontal member, the wheel configured for laterally supporting the bicycle, a preloaded strut hingably attached at a top end to the vertical member, and hingably attached at a bottom end to the horizontal member, and an adjustable device located on the preloaded strut, the adjustable device configured for adjusting a rest compression state of the preloaded strut.

The foregoing and other features and advantages of the disclosed embodiments will be apparent from the following more particular description of the preferred embodiments, as illustrated in the accompanying drawings.

BRIEF DESCRIPTION OF THE DRAWINGS

The claimed subject matter is particularly pointed out and distinctly claimed in the claims at the conclusion of the specification. The foregoing and other features and also the advantages of the disclosed embodiments will be apparent from the following detailed description taken in conjunction with the accompanying drawings.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the claimed subject matter as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The disclosed embodiments solve the problems with the prior art by providing an innovative and ingenious training aid for use with a bicycle. The claimed subject matter comprises training wheels that provide an adjustable amount of give or flex when lateral forces are applied to the device. Thus, the claimed device can be adjusted such that during a sharp turn, when the bicycle tilts significantly into the turn, and the bicycle weight is transferred from the main rear wheel to the claimed training wheel on the side on which the bicycle tilts, the claimed device continues to provide lateral support, thereby facilitating restoring balance against the centrifugal force of the turn, thus resulting in an decreased risk of falling. Since the claimed device provides give or flexibility when the bicycle leans towards said training wheel, this aids the user in learning to ride a bicycle since the act of leaning and maintaining balance are fundamental concepts that must be learned when learning to ride a bicycle.

Furthermore, when a beginner starts to gain proficiency in riding a bicycle, the claimed device may be adjusted to introduce small amounts of leaning to the beginner, so as to start the process of learning this valuable skill. This cannot be done with conventional training wheels that provide little or no give or flexibility. Consequently, the claimed training wheels expand the amount a beginner can learn, once the beginner gains enough proficiency to start learning about leaning and maintaining one's balance. Additionally, the claimed device provides the added benefit or providing a force towards the midpoint or vertical axis of the bicycle when the bicycle turns and leans towards a training wheel. As a result, the claimed training wheels aid a beginner in maintaining his balance during a turn.

Figure 1:
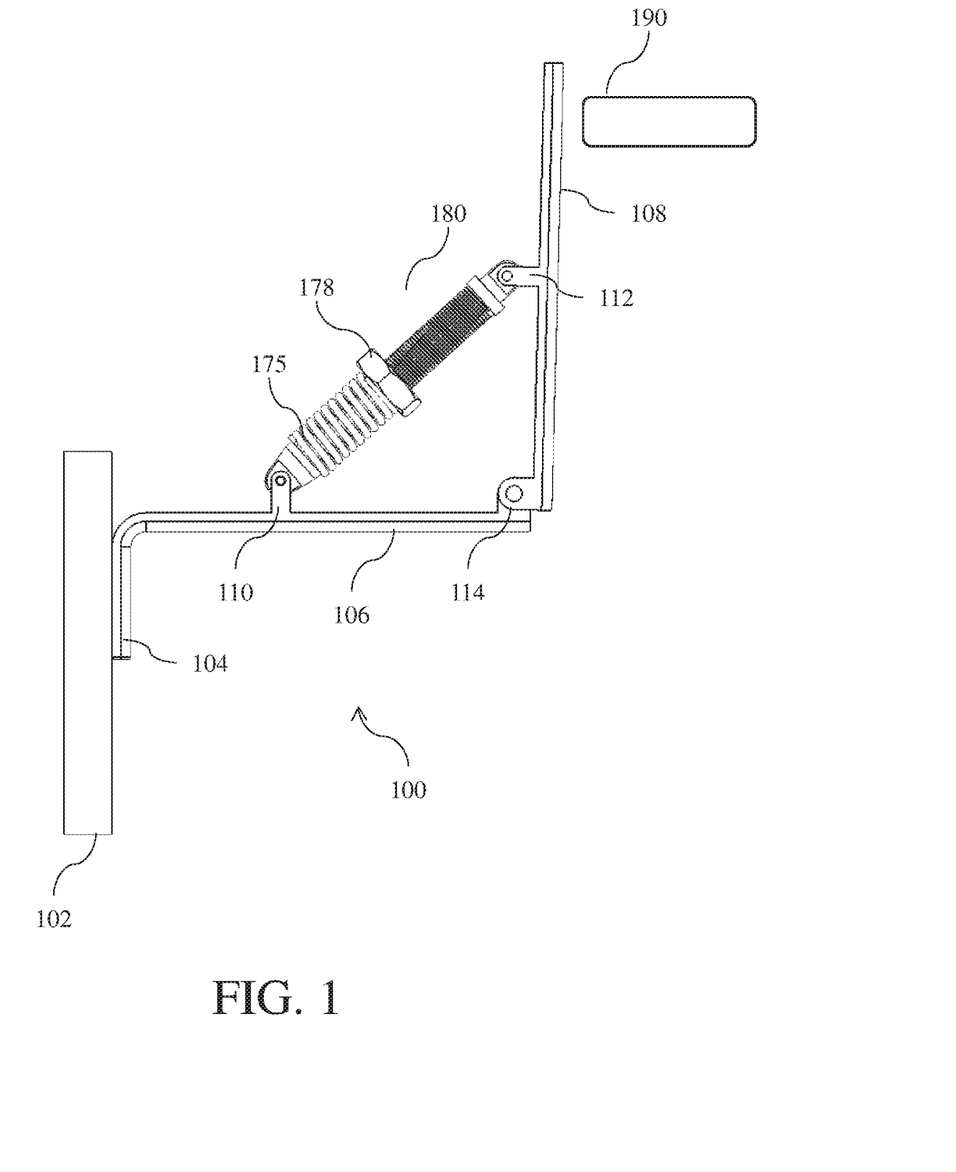
FIG. 1 is a front view of a training aid for a bicycle, showing the shock absorber at full compression, according to one embodiment.

FIG. 1 is a front view of a training aid 100 for a bicycle, showing the shock absorber 180 at full compression, according to one embodiment. The training aid 100 includes a vertical member 108 configured for coupling to a distal end of a rear hub or axle 190 of the bicycle, as well as a horizontal member 106 hingably attached (via hinge 114) at a proximal end to the vertical member 108. In this document, the term proximal refers to a direction towards the bicycle, while the term distal refers to a direction away from the bicycle. The vertical and horizontal members 108, 106 may comprise metallic elongated element that may, for example, have a U-shaped cross section.

The training aid 100 also includes a wheel 102 attached to a distal end of the horizontal member 106, the wheel 102 configured for laterally supporting the bicycle, as well as a shock absorber 180 hingably attached (via hinge 112) at a top end to the vertical member 108, and hingably attached (via hinge 110) at a bottom end to the horizontal member 106. An adjustable device 175, 178 located on the shock absorber 180 is configured for adjusting a rest compression state of the shock absorber 180.

The shock absorber 180 includes a cylinder 703 (see FIG. 7) having a threaded exterior surface 902, and a nut 178 surrounding the cylinder and threaded to rotate around the threaded exterior surface 902 of the cylinder. The shock absorber 180 also includes a helical spring 175 surrounding the rod and cylinder, wherein spring is restricted at one end at the base of the shock absorber 180, and restricted at another end by the nut 178. As the nut is rotated, it moves up and down along the threaded exterior surface 902 of the cylinder. Thus, as the nut is rotated, it adjusts the rest compression state of the shock absorber 180. The nut is restricted from movement past the rings 904 and 906 (see FIG. 9) of the threaded exterior surface 902.

The rest compression state of the shock absorber 180 refers to the state of the shock absorber when the there are no compression forces acting on the shock absorber due to movement of the horizontal or vertical members. I.e., the rest compression state of the shock absorber 180 refers to the state of the shock absorber when horizontal and vertical members have a ninety degree angle between them. FIG. 1 shows the shock absorber 180 at full compression, meaning that the nut 178 has been moved as far down as possible, such that the spring 175 can no longer be compressed any further.

In one alternative, instead of a shock absorber, the training aid 100 includes a tension device, that may be any type of mechanism or device that stores energy, such as an elastic object. The shock absorber 180 may also be a hydraulic, pneumatic or spring piston. In another embodiment, the shock absorber 180 may be a preloaded strut. A strut is a structural component designed to resist longitudinal compression. Struts provide outwards-facing support in their lengthwise direction, which can be used to keep two other components separate. A preloaded strut is a strut that provides outwards force along its lengthwise direction when installed and at rest.

Figure 2:
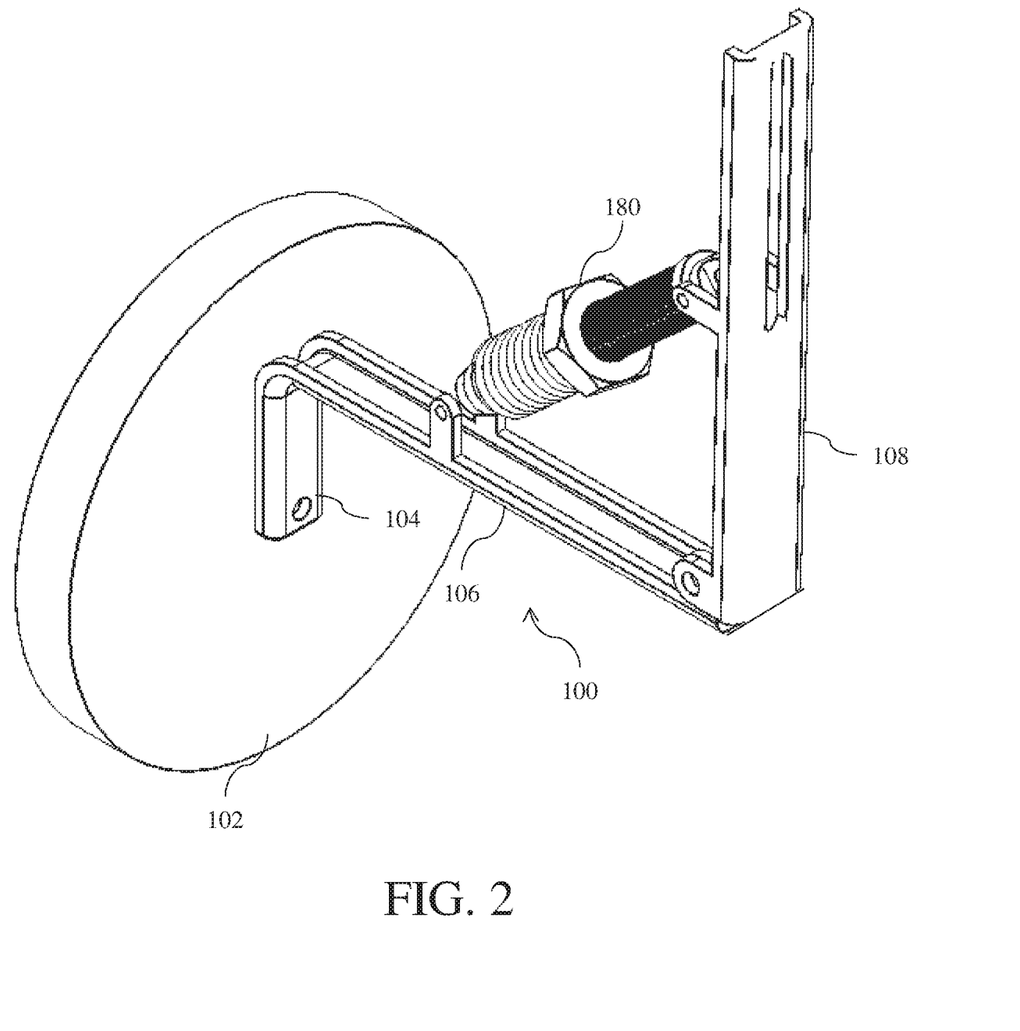
FIG. 2 is a front perspective view of the training aid for a bicycle, showing the shock absorber at full compression, according to one embodiment.

FIG. 2 is a front perspective view of the training aid 100 for a bicycle, showing the shock absorber at full compression, according to one embodiment. FIG. 2 shows the horizontal member 106 further includes a vertical element 104 on its distal end, wherein the vertical element is coupled to the wheel 102.

Figure 3:
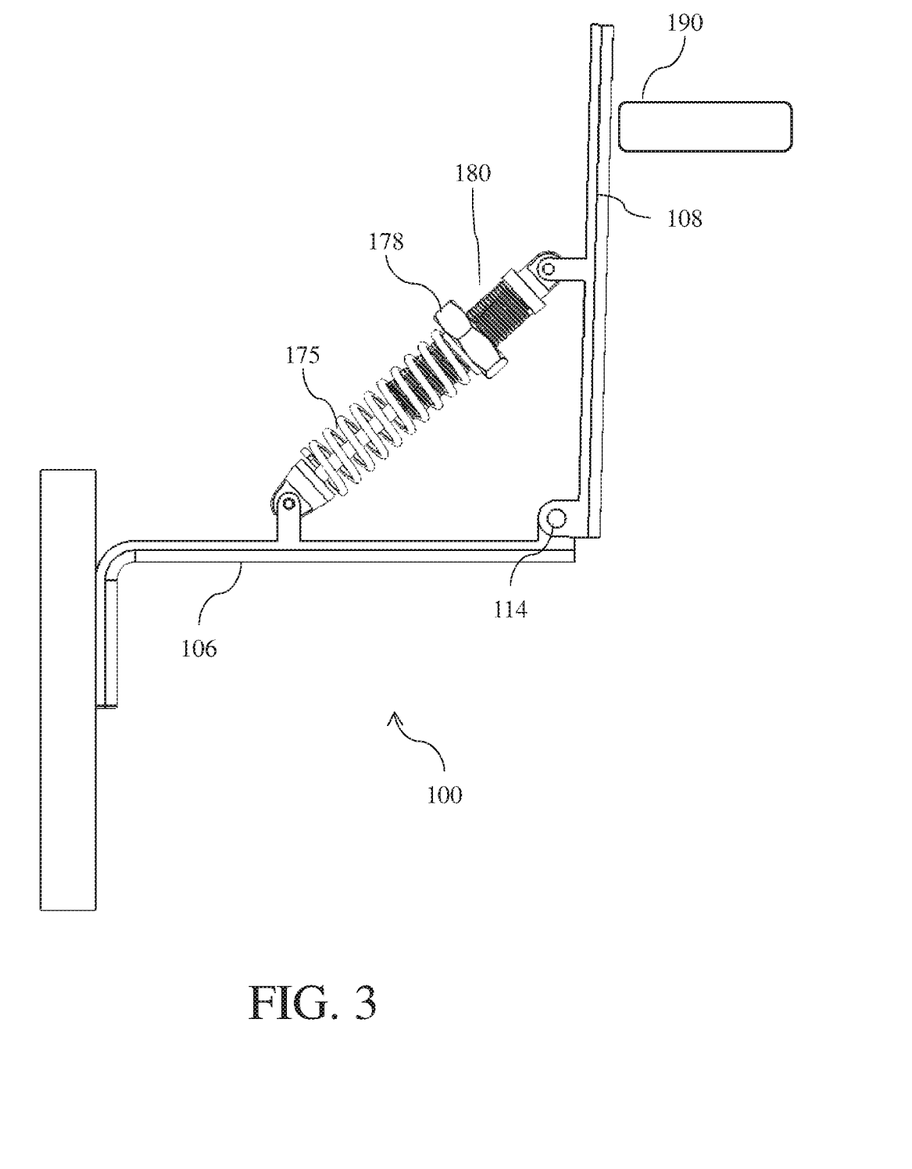
FIG. 3 is a front view of the training aid for a bicycle, showing the shock absorber at half compression or half extension, according to one embodiment.
Figure 4:
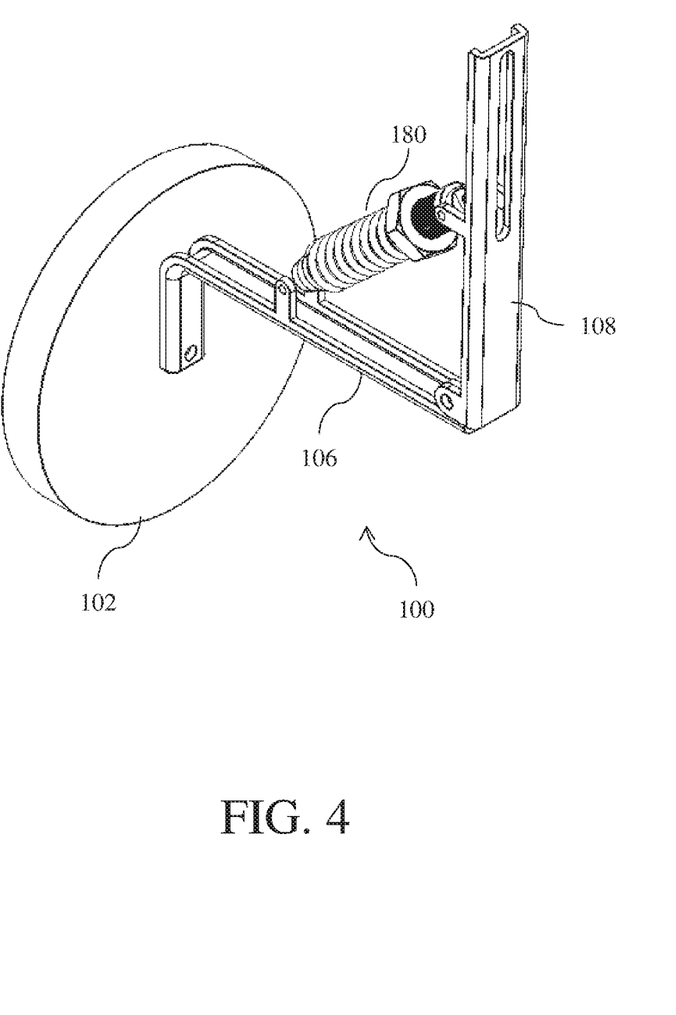
FIG. 4 is a front perspective view of the training aid for a bicycle, showing the shock absorber at half compression or half extension, according to one embodiment.

FIG. 3 is a front view of the training aid 100 for a bicycle, showing the shock absorber at half compression or half extension, according to one embodiment. FIG. 3 shows that the nut 178 has been moved approximately halfway up the threaded exterior surface 902 of the cylinder, such that the spring 175 is compressed at about half its capacity. FIG. 4 is a front perspective view of the training aid 100 for a bicycle, showing the shock absorber at half compression or half extension, according to one embodiment.

The vertical member 108 further includes a hinge 114 at a lower end, wherein the horizontal member 108 is coupled to the hinge 114 at its proximal end, wherein the hinge 114 is configured so as to prohibit an angle greater than ninety degrees between the horizontal member and the vertical member.

Figure 5:
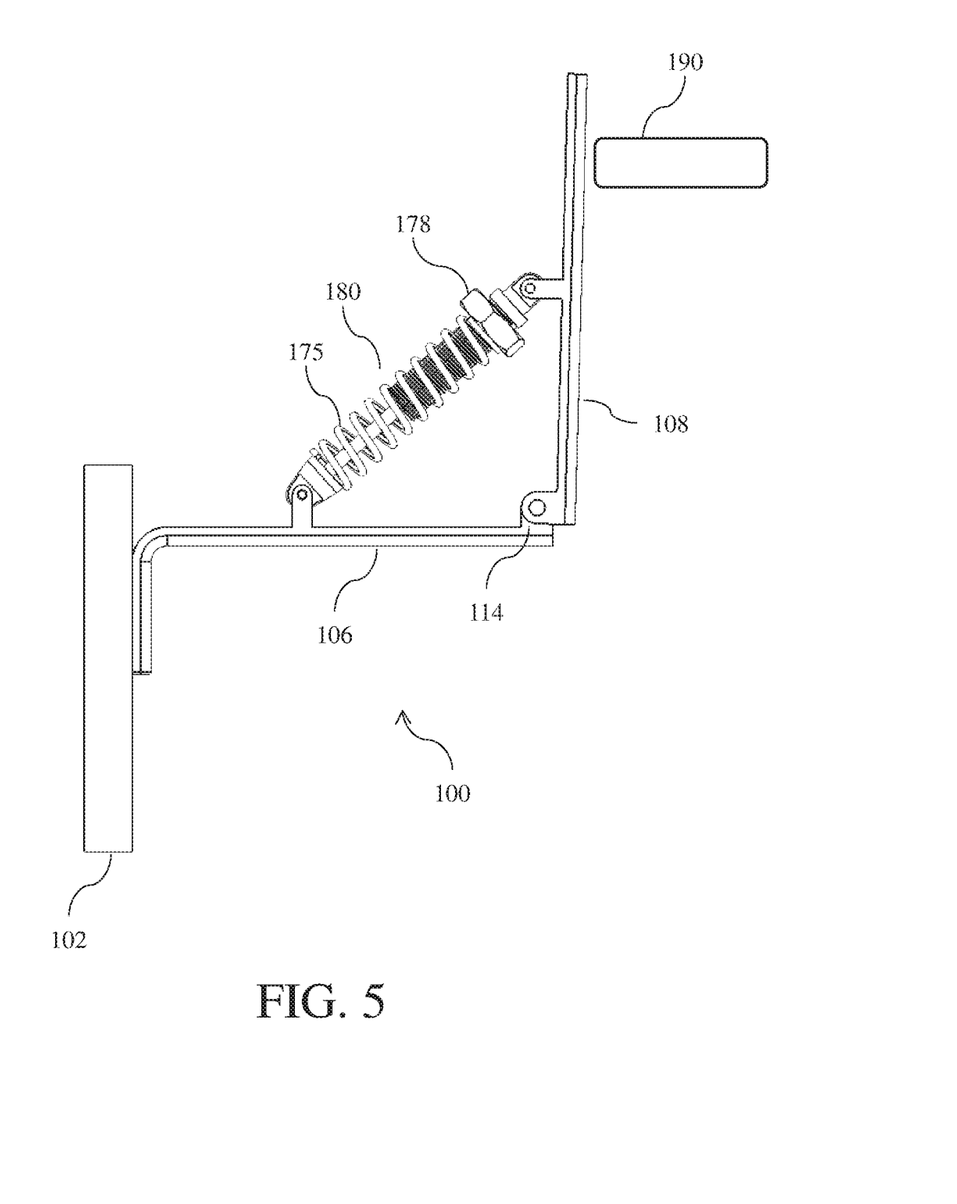
FIG. 5 is a front view of the training aid for a bicycle, showing the shock absorber at full extension, according to one embodiment.
Figure 6:
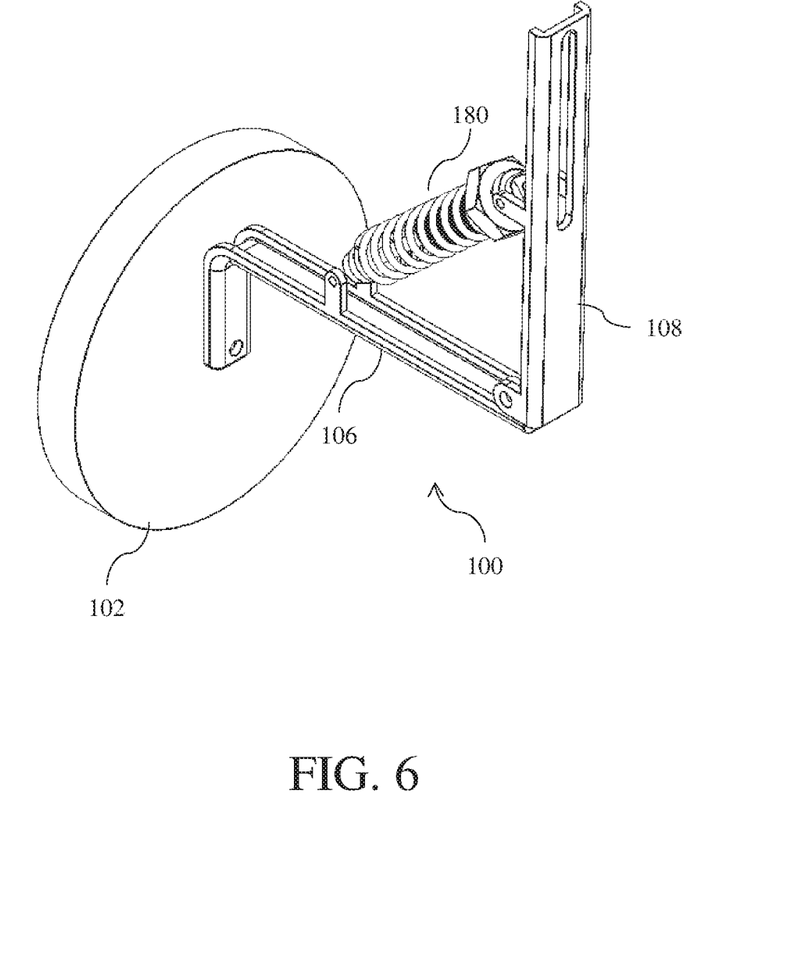
FIG. 6 is a front perspective view of the training aid for a bicycle, showing the shock absorber at full extension, according to one embodiment.

FIG. 5 is a front view of the training aid 100 for a bicycle, showing the shock absorber at full extension, according to one embodiment. FIG. 5 shows that the nut 178 has been moved as far up along the threaded exterior surface 902 of the cylinder as possible, such that the spring 175 is extended to its full capacity. FIG. 6 is a front perspective view of the training aid 100 for a bicycle, showing the shock absorber at full extension, according to one embodiment.

Figure 7:
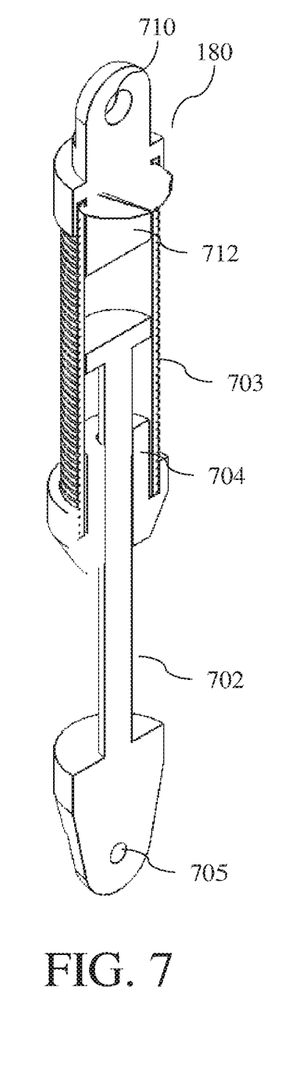
FIG. 7 is a front perspective cross-sectional view of the shock absorber at half compression or half extension, according to one embodiment.
Figure 8:
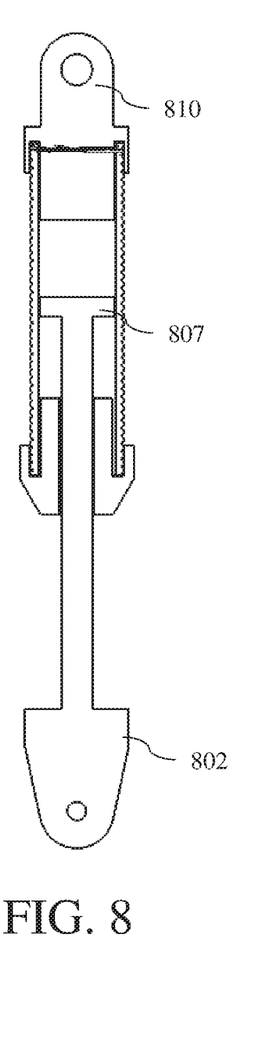
FIG. 8 is a front cross-sectional view of the shock absorber at half compression or half extension, according to one embodiment.
Figure 9:
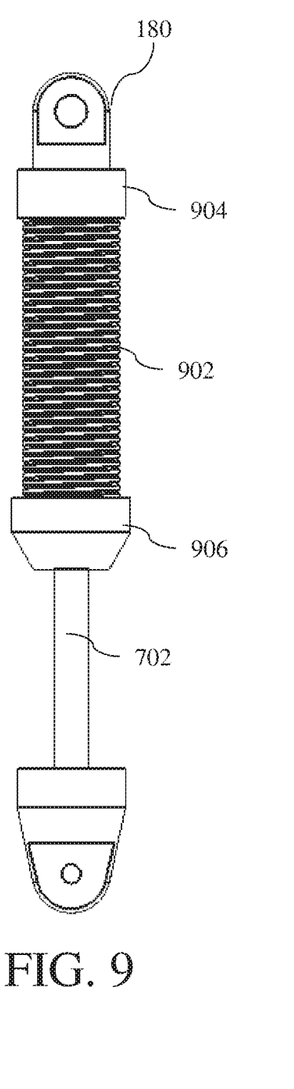
FIG. 9 is a front view of the shock absorber at half compression or half extension, according to one embodiment.

FIG. 7 is a front perspective cross-sectional view of the shock absorber 180 at half compression or half extension, while FIG. 8 is a front cross-sectional view of the shock absorber 180 at half compression or half extension, and FIG. 9 is a front view of the shock absorber at half compression or half extension, according to one embodiment. FIGS. 7 through 9 shows that the shock absorber 180 includes a cylinder 703 having a threaded exterior surface 902, a rod 702 including a piston 807 at a top end of the rod, and a base 802 at a bottom end of the rod, wherein the distal end of the rod extends into or inside of the cylinder 703. Recall the helical spring 175 surrounds the rod 702 and cylinder 703, wherein the spring 175 is restricted at the bottom end by the base 802 of the rod, and restricted at the top end by the nut 178. A top stopper 712 is a cylindrical element that prevents the piston 807 from moving upwards past the top stopper and the bottom stopper 704 is also a cylindrical element that prevents the piston 807 from moving downwards past the bottom stopper. The top end 810 of the shock absorber includes an orifice 710 that is used to attach the shock absorber to the hinge 112. The base 802 of the rod includes an orifice 705 that is used to attach the shock absorber to the hinge 110.

Figure 10:
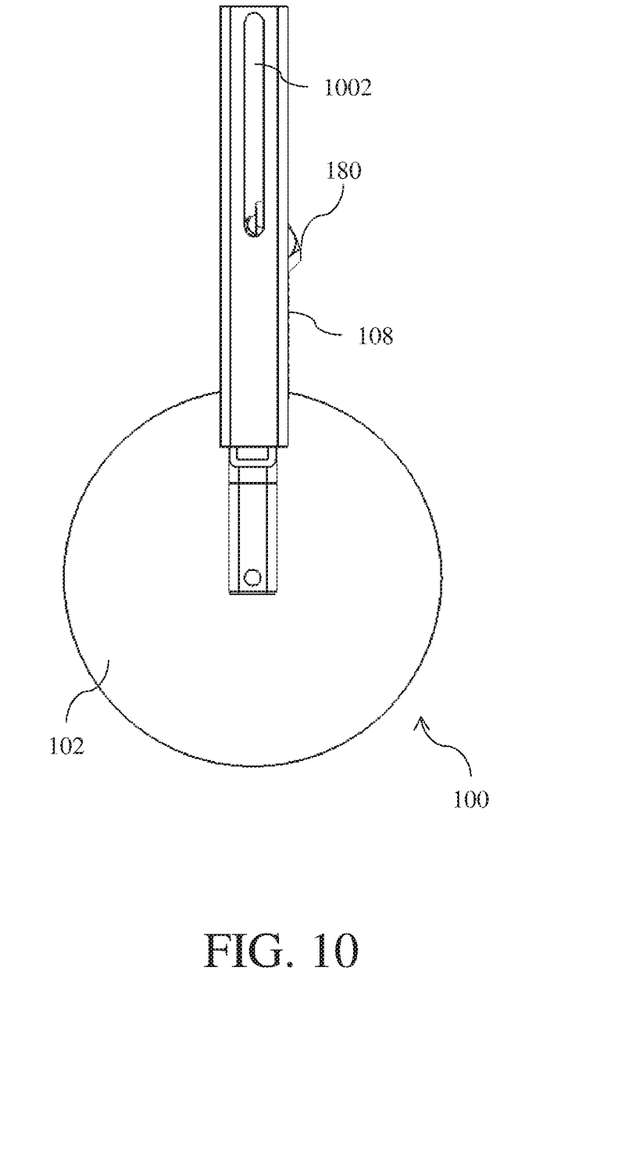
FIG. 10 is a side view of the training aid for a bicycle, according to one embodiment.

FIG. 10 is a side view of the training aid 100 for a bicycle, according to one embodiment. FIG. 10 shows the vertical member 108 further includes at least one orifice 1002 configured for allowing a bolt to extend through said at least one orifice, so as to couple the device 100 to the distal end of the rear hub or axle of the bicycle.

Figure 11:
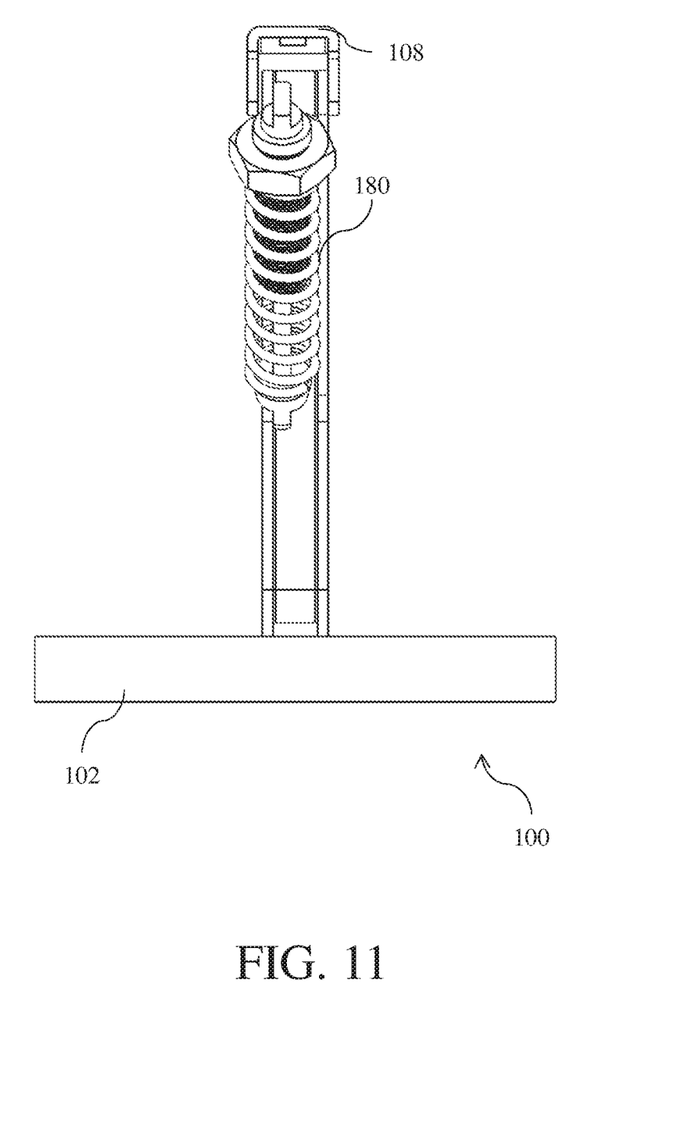
FIG. 11 is a top view of the training aid for a bicycle, according to one embodiment.
Figure 12:
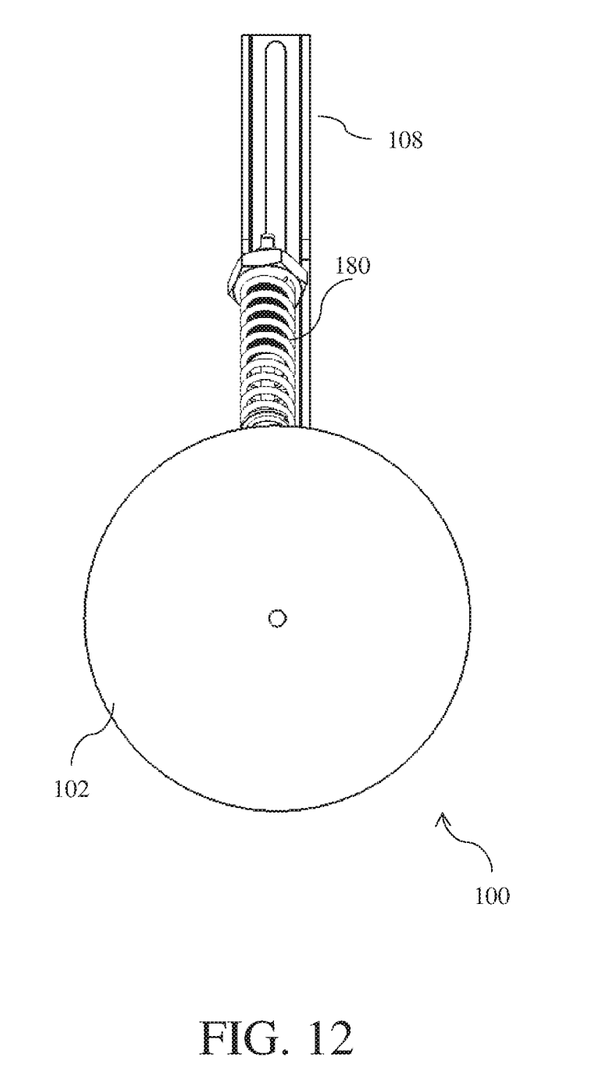
FIG. 12 is another side view of the training aid for a bicycle, according to one embodiment.

FIG. 11 is a top view of the training aid for a bicycle, while FIG. 12 is another side view of the training aid for a bicycle, according to one embodiment.

FIG. 13 is a rear view of prior art training wheels. FIG. 13 shows that when the bicycle experiences a right turn, especially a sharp turn, the bicycle will lean to the right and place additional tension or weight on the right training wheel 1304, so as to lift the left training wheel 1302 off the ground. When the bicycle leans excessively to the right, the wheel 1310 will also rise off the ground, which negatively affects the ability of the rider to balance himself and maintain control over the bicycle.

Figure 14:
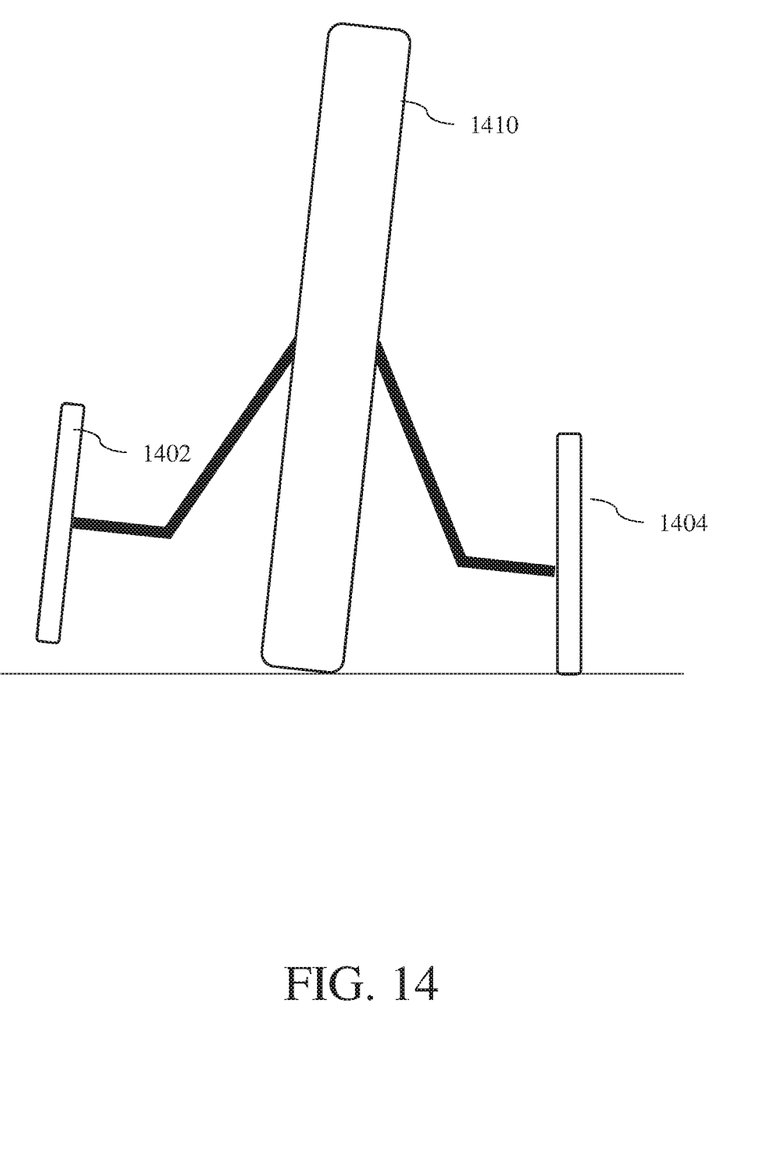
FIG. 14 is a rear view of the training aid for a bicycle, according to one embodiment.

FIG. 14 is a rear view of the training aid for a bicycle, according to one embodiment. FIG. 14 shows that when the bicycle experiences a right turn, especially a sharp turn, the bicycle will lean to the right and place additional tension or weight on the right training wheel 1404, so as to lift the left training wheel 1402 off the ground. When the bicycle leans excessively to the right, however, the spring mechanism 180 of the training aid 100 compresses to allow for the wheel 1410 will stay on the ground, which allows the rider to balance himself and maintain control over the bicycle. Furthermore, when the bicycle leans excessively to the right, the spring mechanism 180 of the training aid 100 provides a force towards the bicycle, which pushes the rider toward the vertical axis of the bicycle, so as to maintain control over the bicycle.

Although specific embodiments have been disclosed, those having ordinary skill in the art will understand that changes can be made to the specific embodiments without departing from the spirit and scope of the claimed subject matter. The scope of the claimed subject matter is not to be restricted, therefore, to the specific embodiments. Furthermore, it is intended that the appended claims cover any and all such applications, modifications, and embodiments within the scope of the claimed subject matter.

I claim:

1. A stabilizing apparatus for a bicycle, comprising:
 a vertical member configured for coupling to a distal end of a rear hub of the bicycle, wherein the vertical member further includes at least one orifice configured for allowing a bolt to extend through said at least one orifice, so as to couple the stabilizing apparatus to the distal end of the rear hub of the bicycle, and wherein the vertical member further includes a hinge at a lower end;
 a vertical slot located on the vertical member, the vertical slot configured for allowing the height of the apparatus to be adjusted up and down on the bicycle;
 a horizontal member hingably attached at a proximal end to the vertical member, wherein the horizontal member is coupled to the hinge at its proximal end, wherein the hinge is configured so as to prohibit an angle greater than ninety degrees between the horizontal member and the vertical member, and wherein the horizontal member further includes a vertical element on its distal end;
 a wheel attached to a distal end of the horizontal member, the wheel configured for laterally supporting the bicycle, wherein the wheel is coupled to the vertical element of the horizontal member;
 a preloaded strut hingably attached at a top end to the vertical member, and hingably attached at a bottom end to the horizontal member, wherein the preloaded strut includes a first hinge at its top end and wherein the first hinge is coupled to the vertical member, and wherein the preloaded strut includes a second hinge at its bottom end and wherein the second hinge is coupled to the horizontal member; wherein the preloaded strut further comprises:
  a) a cylinder having a threaded exterior surface;
  b) a nut surrounding the cylinder and threaded to rotate around the threaded exterior surface of the cylinder;
  c) a rod including a piston at a top end of the rod, and a base at a bottom end of the rod, wherein a distal end of the rod extends into the cylinder;
  d) a top stopper located inside of the cylinder, wherein the top stopper prevents the piston from moving upwards past the bottom stopper;
  e) a bottom stopper located inside of the cylinder, wherein the bottom stopper prevents the piston from moving downwards past the bottom stopper;

f) a helical spring surrounding the rod and the cylinder, wherein the spring is restricted at one end by the base of the rod, and restricted at another end by the nut; and an adjustable device located on the preloaded strut, the adjustable device configured for adjusting a rest compression state of the preloaded strut.

2. The stabilizing apparatus of claim 1, wherein the nut rotates around the threaded exterior surface of the cylinder so as to move along the exterior surface of the cylinder, and so as to adjust the rest compression state of the preloaded strut.

3. A stabilizing apparatus for a bicycle, comprising:
a vertical member configured for coupling to a distal end of a rear hub of the bicycle;
a vertical slot located on the vertical member, the vertical slot configured for allowing the height of the apparatus to be adjusted up and down on the bicycle;
a horizontal member hingably attached at a proximal end to the vertical member;
a wheel attached to a distal end of the horizontal member, the wheel configured for laterally supporting the bicycle;
a shock absorber hingably attached at a top end to the vertical member, and hingably attached at a bottom end to the horizontal member, the shock absorber comprising:
 a) a cylinder having a threaded exterior surface;
 b) a nut surrounding the cylinder and threaded to rotate around the threaded exterior surface of the cylinder;
 c) a rod including a piston at a top end of the rod, and a base at a bottom end of the rod, wherein a distal end of the rod extends into the cylinder;
 d) a top stopper located inside of the cylinder, wherein the top stopper prevents the piston from moving upwards past the bottom stopper;
 e) a bottom stopper located inside of the cylinder, wherein the bottom stopper prevents the piston from moving downwards past the bottom stopper; and
 f) a helical spring surrounding the rod and the cylinder, wherein the spring is restricted at one end by the base of the rod, and restricted at another end by the nut; and wherein movement of the nut along the exterior surface of the cylinder adjusts a rest compression state of the shock absorber wherein the shock absorber is in a rest compression state when the nut is closest to a top end of the cylinder; and wherein the shock absorber is in a full compression state when the nut is closest to a bottom end of the cylinder.

4. The stabilizing apparatus of claim 3, wherein the vertical member further includes at least one orifice configured for allowing a bolt to extend through said at least one orifice, so as to couple the stabilizing apparatus to the distal end of the rear hub of the bicycle.

5. The stabilizing apparatus of claim 4, wherein the vertical member further includes a hinge at a lower end.

6. The stabilizing apparatus of claim 5, wherein the horizontal member is coupled to the hinge at its proximal end, wherein the hinge is configured so as to prohibit an angle greater than ninety degrees between the horizontal member and the vertical member.

7. The stabilizing apparatus of claim 6, wherein the horizontal member further includes a vertical element on its distal end.

8. The stabilizing apparatus of claim 7, wherein the wheel is coupled to the vertical element of the horizontal member.

9. The stabilizing apparatus of claim 8, wherein the shock absorber includes a first hinge at its top end and wherein the first hinge is coupled to the vertical member.

10. The stabilizing apparatus of claim 9, wherein the shock absorber includes a second hinge at its bottom end and wherein the second hinge is coupled to the horizontal member.

* * * * *